US009814112B2

(12) United States Patent
Gredler et al.

(10) Patent No.: US 9,814,112 B2
(45) Date of Patent: Nov. 7, 2017

(54) LOAD CONTROL DEVICE FOR A LIGHT-EMITTING DIODE LIGHT SOURCE

(71) Applicant: Lutron Electronics Co., Inc., Coopersburg, PA (US)

(72) Inventors: Timothy P. Gredler, Center Valley, PA (US); Matthew R. Zartman, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 15/460,973

(22) Filed: Mar. 16, 2017

(65) Prior Publication Data

US 2017/0188430 A1    Jun. 29, 2017

Related U.S. Application Data

(63) Continuation of application No. 15/291,308, filed on Oct. 12, 2016, now Pat. No. 9,635,726, which is a
(Continued)

(51) Int. Cl.
  *H05B 37/02* (2006.01)
  *H05B 33/08* (2006.01)

(52) U.S. Cl.
  CPC ....... *H05B 33/0845* (2013.01); *H05B 33/089* (2013.01); *H05B 33/0812* (2013.01); *H05B 33/0815* (2013.01)

(58) Field of Classification Search
  CPC .... H05B 37/02; H05B 33/08; H05B 33/0815; H05B 33/0833; H05B 33/0839; H05B 33/0845; H05B 33/0851
  (Continued)

(56) References Cited

U.S. PATENT DOCUMENTS 4,845,481 A    7/1989 Havel
5,017,837 A    5/1991 Hanna et al.
(Continued)

FOREIGN PATENT DOCUMENTS

CN    102612227 A    7/2012
EP    2579684 A1    4/2013
(Continued)

*Primary Examiner* — Jimmy Vu
(74) *Attorney, Agent, or Firm* — Glen Farbanish; Philip Smith

(57) ABSTRACT

A load control device for controlling the intensity of a lighting load, such as a light-emitting diode (LED) light source, may include a power converter circuit operable to receive a rectified AC voltage and to generate a DC bus voltage, a load regulation circuit operable to receive the bus voltage and to control the magnitude of a load current conducted through the lighting load, and a control circuit operatively coupled to the load regulation circuit for pulse width modulating or pulse frequency modulating the load current to control the intensity of the lighting load to a target intensity. The control circuit may control the intensity of the lighting load by pulse width modulating the load current when the target intensity is above a predetermined threshold and control the intensity of the lighting load by pulse frequency modulating the load current when the target intensity is below the predetermined threshold.

20 Claims, 6 Drawing Sheets

Related U.S. Application Data continuation of application No. 14/796,278, filed on Jul. 10, 2015, now Pat. No. 9,497,817, which is a continuation of application No. 14/290,584, filed on May 29, 2014, now Pat. No. 9,113,521.

(60) Provisional application No. 61/828,337, filed on May 29, 2013.

(58) Field of Classification Search
USPC ........ 315/200 R, 209 R, 291, 297, 299, 307, 315/308
See application file for complete search history.

(56) References Cited

U.S. PATENT DOCUMENTS

| | | |
|---|---|---|
| 5,041,763 A | 8/1991 | Sullivan et al. |
| 5,399,940 A | 3/1995 | Hanna et al. |
| 6,016,038 A | 1/2000 | Mueller et al. |
| 6,111,368 A | 8/2000 | Luchaco |
| 6,150,771 A | 11/2000 | Perry |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,707,264 B2 | 3/2004 | Lin et al. |
| 6,788,006 B2 | 9/2004 | Yamamoto |
| 6,841,947 B2 | 1/2005 | Berg-Johansen |
| 7,038,399 B2 | 5/2006 | Lys et al. |
| 7,071,762 B2 | 7/2006 | Xu et al. |
| 7,211,966 B2 | 5/2007 | Green et al. |
| 7,242,152 B2 | 7/2007 | Dowling et al. |
| 7,309,965 B2 | 12/2007 | Dowling et al. |
| 7,352,138 B2 | 4/2008 | Lys et al. |
| 7,535,183 B2 | 5/2009 | Gurr |
| 7,759,881 B1 | 7/2010 | Melanson |
| 7,855,520 B2 | 12/2010 | Leng |
| 8,044,608 B2 | 10/2011 | Kuo et al. |
| 8,154,223 B2 | 4/2012 | Hsu et al. |
| 8,198,832 B2 | 6/2012 | Bai et al. |
| 8,258,714 B2 | 9/2012 | Liu |
| 8,288,967 B2 | 10/2012 | Liu |
| 8,288,969 B2 | 10/2012 | Hsu et al. |
| 8,339,053 B2 | 12/2012 | Yamasaki et al. |
| 8,339,067 B2 | 12/2012 | Lin et al. |
| 8,368,322 B2 | 2/2013 | Yu et al. |
| 8,378,589 B2 | 2/2013 | Kuo et al. |
| RE44,228 E | 5/2013 | Park et al. |
| 8,466,628 B2 | 6/2013 | Shearer et al. |
| 8,482,219 B2 | 7/2013 | Kuo et al. |
| 8,487,540 B2 | 7/2013 | Dijkstra et al. |
| 8,487,546 B2 | 7/2013 | Melanson |
| 8,492,982 B2 | 7/2013 | Hagino et al. |
| 8,492,987 B2 | 7/2013 | Nuhfer et al. |
| 8,558,474 B1 | 10/2013 | Zhang et al. |
| 8,581,511 B2 | 11/2013 | Kim et al. |
| 8,587,968 B2 | 11/2013 | Zhu et al. |
| 8,624,526 B2 | 1/2014 | Huang |
| 9,295,119 B2 * | 3/2016 | Hiramatu ........... H05B 33/0815 |
| 2006/0022916 A1 | 2/2006 | Aiello |
| 2006/0273772 A1 | 12/2006 | Groom |
| 2009/0160360 A1 | 6/2009 | Lim et al. |
| 2011/0080110 A1 | 4/2011 | Nuhfer et al. |
| 2012/0200229 A1 | 8/2012 | Kunst et al. |
| 2013/0141001 A1 | 6/2013 | Datta et al. |
| 2013/0234612 A1 | 9/2013 | Zeng |
| 2014/0354170 A1 | 12/2014 | Gredler et al. |

FOREIGN PATENT DOCUMENTS

| | | |
|---|---|---|
| EP | 2383873 B1 | 6/2013 |
| JP | 2001-093662 A | 4/2001 |

\* cited by examiner

LOAD CONTROL DEVICE FOR A LIGHT-EMITTING DIODE LIGHT SOURCE

CROSS REFERENCE TO RELATED APPLICATIONS

This is a continuation of U.S. patent application Ser. No. 15/291,308, filed Oct. 12, 2016, which is a continuation of U.S. patent application Ser. No. 14/796,278, filed Jul. 10, 2015, and patented as U.S. Pat. No. 9,497,817 on Nov. 15, 2016, which is a continuation of U.S. patent application Ser. No. 14/290,584, filed May 29, 2014, and patented as U.S. Pat. No. 9,113,521 on Aug. 18, 2015, which claims the benefit of U.S. Provisional Patent Application No. 61/828,337, filed May 29, 2013, the contents of which are hereby incorporated by reference in their entirety.

BACKGROUND

Light-emitting diode (LED) light sources are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) may be coupled between a power source (e.g., an alternating-current (AC) source) and the LED light source for regulating the power supplied to the LED light source. The LED driver may regulate either the voltage provided to the LED light source to a particular value, the current supplied to the LED light source to a specific peak current value, or may regulate both the current and voltage.

LED light sources may comprise a plurality of individual LEDs that may be arranged in a series and parallel relationship. In other words, a plurality of LEDs may be arranged in a series string and a number of series strings may be arranged in parallel to achieve the desired light output. For example, five LEDs in a first series string each with a forward bias of approximately three volts (V) and each consuming approximately one watt of power (at 350 mA through the string) consume about 5 W. A second string of a series of five LEDs connected in parallel across the first string will result in a power consumption of 10 W with each string drawing 350 mA. Thus, an LED driver would supply 700 mA to the two strings of LEDs, and since each string has five LEDs, the output voltage provided by the LED driver would be about 15 volts. Additional strings of LEDs can be placed in parallel for additional light output, however, the LED driver should be operable to provide the necessary current. Alternatively, more LEDs can be placed in series on each string, and as a result, the LED driver should also be operable to provide the necessary voltage (e.g., 18 volts for a series of six LEDs).

LED light sources are typically rated to be driven via one of two different control techniques: a current load control technique or a voltage load control technique. An LED light source that is rated for the current load control technique is also characterized by a rated current (e.g., 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

In addition, it is known that the light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output.

However, an LED light source may become instable or exhibit undesirable characteristics when dimmed to a low intensity level or when dimmed to off (i.e., 0% intensity). For example, when dimmed to a low intensity level or off, an LED light source may flicker, may exhibit inconsistent brightness or color across the individual LEDs of the LED light source, and/or may suddenly drop in intensity during the dimming procedure (e.g., from approximately 1% to off). For instance, when dimming an LED light source using the PWM technique, the on time of the duty cycle of the pulsed signal may reach a threshold where, if reduced any further, causes the LED light source to become instable or exhibit undesirable characteristics. Similarly, when dimming an LED light source using the CCR technique, the DC magnitude of the current provided to the LED light source may reach a threshold where, if reduced any further, causes the LED light source to become instable or exhibit undesirable characteristics.

SUMMARY

As described herein, a load control device for controlling (e.g., dimming) an intensity of a lighting load to a low intensity level and/or off is provided. The load control device may comprise a power converter circuit, a load regulation circuit, and/or a control circuit. The power converter circuit may be operable to receive a rectified AC voltage and to generate a DC bus voltage. The load regulation circuit may be operable to receive the DC bus voltage and to control a magnitude of a load current conducted through the lighting load, for example, using the DC bus voltage. The control circuit may be operatively coupled to the load regulation circuit for pulse width modulating and/or pulse frequency modulating the load current to control the intensity of the lighting load to a target intensity. The lighting load may comprise an LED light source. The load regulation circuit may comprise an LED drive circuit.

The control circuit may be configured to control the intensity of the lighting load by pulse width modulating the load current when the target intensity is above a predetermined threshold and control the intensity of the lighting load by pulse frequency modulating the load current when the target intensity is below the predetermined threshold. The predetermined threshold may be, for example, a low-end intensity (e.g., 1%). Pulse width modulating the load current may comprise maintaining a frequency of the load current constant and adjusting an on time of the load current. Pulse frequency modulating the load current may comprise maintaining the on time of the load current constant and adjusting the frequency of the load current.

For example, the control circuit may be configured to maintain the frequency of the load current at a normal pulse width modulation (PWM) frequency and adjust the on time of the load current between a maximum on time and a minimum on time when the target intensity is above the predetermined threshold, for example, when the target intensity is between a high-end intensity and the low-end intensity. The control circuit may be configured to maintain the on time of the load current at the minimum on time and adjust the frequency of the load current between the normal PWM frequency and a minimum PWM frequency when the target intensity is below the predetermined threshold, for example, when the target intensity is between the low-end intensity and a minimum intensity. The minimum intensity may be below (i.e., less than) the low-end intensity. The control circuit may be configured to maintain the frequency of the load current at the minimum PWM frequency and adjust the on time of the load current between the minimum on time and an ultra-low minimum on time when the target intensity is below the minimum intensity, for example, when the target intensity is between the minimum intensity and an ultra-low minimum intensity. For instance, the control circuit may dim the LED light source to off (i.e., the ultra-low minimum intensity may be 0% intensity).

The control circuit may be configured to dim the LED light source to off. For example, the control circuit may be configured to pulse width modulate the load current when the target intensity is below the minimum intensity, which is below the predetermined threshold (e.g., a low-end intensity). As such, the control circuit may be configured to control the intensity of the lighting load from the minimum intensity to off by pulse width modulating the load current. The control circuit may be configured to control the intensity of the lighting load from the predetermined threshold to off by pulse frequency modulating the load current. The control circuit may be configured to maintain a frequency of the load current constant, maintain an on time of the load current constant, and decrease a magnitude of the DC bus voltage when the target intensity is below the minimum intensity. For example, control circuit may control the intensity of the lighting load to off by decreasing the magnitude of the DC bus voltage.

The control circuit may be configured to control the intensity of the lighting load by pulse width modulating the load current when the target intensity is within a first intensity range and control the intensity of the lighting load by pulse frequency modulating the load current when the target intensity is within a second intensity range. The first intensity range may be greater than or less than the second intensity range. The control circuit may be configured to receive a command and control (e.g., dim) the intensity of the lighting load below the first intensity range and below the second intensity range to off. For example, the load control circuit may be configured to control the intensity of the lighting load below the second intensity range to off by pulse width modulating and/or pulse frequency modulating the load current. The load control circuit may be configured to control the intensity of the lighting load below the first intensity range and below the second intensity range to off by maintaining the frequency of the load current constant, maintaining the on time of the load current constant, and decreasing the magnitude of the DC bus voltage.

DETAILED DESCRIPTION

Figure 1:
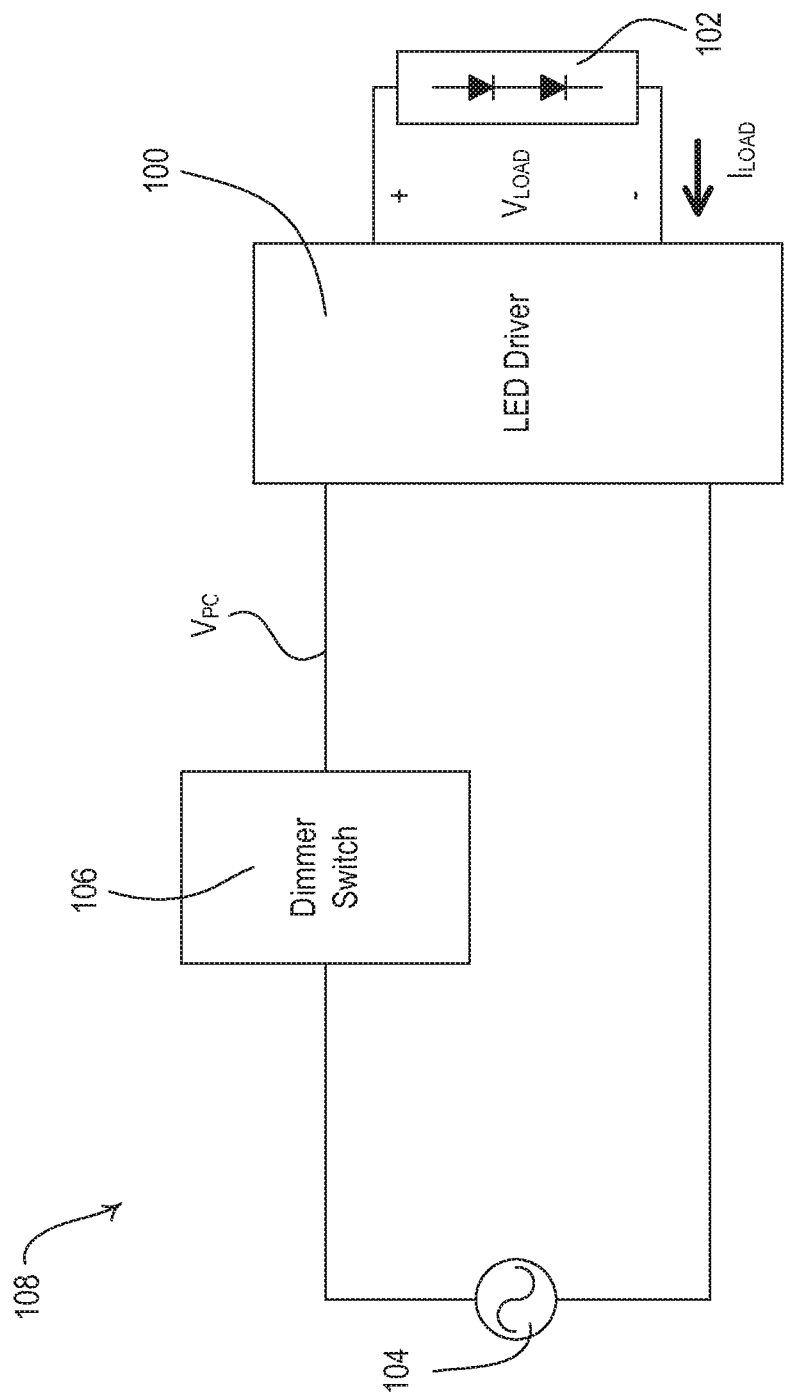
FIG. 1 is a block diagram of an example system that comprises a light-emitting diode (LED) driver for controlling the intensity of an LED light source.

FIG. 1 is a block diagram of an example system that comprises a light-emitting diode (LED) driver for controlling the intensity of an LED light source. A system 108 may comprise an alternating-current (AC) power source 104, a dimmer switch 106, an LED driver 100, and/or an LED light source 102. The LED driver 100 may control an intensity of the LED light source 102. An example of the LED light source 102 may be an LED light engine. The LED light source 102 is shown as a plurality of LEDs connected in series but may comprise a single LED or a plurality of LEDs connected in series, parallel, or a suitable combination thereof, for example, depending on the particular lighting system. The LED light source 102 may comprise one or more organic light-emitting diodes (OLEDs).

The LED driver 100 may be coupled to the AC power source 104 via the dimmer switch 106. The dimmer switch 106 may generate a phase-control signal $V_{PC}$ (e.g., a dimmed-hot voltage). The dimmer switch 106 may provide the phase-control signal $V_{PC}$ to the LED driver 100. The dimmer switch 106 may comprise a bidirectional semiconductor switch (not shown), such as, for example, a triac or two anti-series-connected field-effect transistors (FETs), which may be coupled in series between the AC power source 104 and the LED driver 100. The dimmer switch 106 may control the bidirectional semiconductor switch to be conductive for a conduction period $T_{CON}$ each half-cycle of the AC power source 104 to generate the phase-control signal $V_{PC}$.

The LED driver 100 may turn the LED light source 102 on and off in response to the conduction period $T_{CON}$ of the phase-control signal $V_{PC}$ received from the dimmer switch 106. The LED driver 100 may adjust (i.e., dim) a present intensity $L_{PRES}$ of the LED light source 102 to a target intensity $L_{TRGT}$ in response to the phase-control signal $V_{PC}$. The target intensity $L_{TRGT}$ may range across a dimming range of the LED light source 102. For example, the dimming range of the LED light source 102 may be between a low-end intensity $L_{LE}$ (e.g., approximately 1%) and a high-end intensity $L_{HE}$ (e.g., approximately 100%). The LED driver 100 may control the magnitude of a load current $I_{LOAD}$ through the LED light source 102 and/or the magnitude of a load voltage $V_{LOAD}$ across the LED light source. Accordingly, the LED driver 100 may control at least one of the load voltage $V_{LOAD}$ across the LED light source 102 and the load current $I_{LOAD}$ through the LED light source to control the amount of power delivered to the LED light source, for example, depending upon a mode of operation of the LED driver (e.g., as described herein).

The LED driver 100 may work with (i.e., control) a plurality of different LED light sources. For example, the LED driver 100 may work with LED lights sources that are rated to operate using different load control techniques, different dimming techniques, and/or different magnitudes of load current and/or voltage. The LED driver 100 may control the magnitude of the load current $I_{LOAD}$ through the LED light source 102 and/or the load voltage $V_{LOAD}$ across the LED light source using different modes of operation. For example, the LED driver 100 may use a current load control mode (i.e., for using the current load control technique) and/or a voltage load control mode (i.e., for using the voltage load control technique). The LED driver 100 may adjust the magnitude to which the LED driver 100 controls the load current $I_{LOAD}$ through the LED light source 102 in the current load control mode. The LED driver 100 may adjust the magnitude to which the LED driver 100 controls the load voltage $V_{LOAD}$ across the LED light source in the voltage load control mode.

When operating in the current load control mode, the LED driver 100 may control the intensity of the LED light source 102 using a PWM dimming mode (i.e., for using the PWM dimming technique), a CCR dimming mode (i.e., for using the CCR dimming technique), and/or a pulse frequency modulation (PFM) dimming mode (i.e., for using the PFM dimming technique). In the PWM dimming mode, the LED driver 100 may control the load current $I_{LOAD}$ by altering the pulse duration of the load current $I_{LOAD}$ and maintaining the frequency of the load current $I_{LOAD}$ constant. In the PFM dimming mode, the LED driver 100 may control the load current $I_{LOAD}$ by maintaining the pulse duration of the load current $I_{LOAD}$ constant and altering the frequency of the load current $I_{LOAD}$. In the CCR dimming mode, the LED driver 100 may control the load current $I_{LOAD}$ by altering the DC magnitude of the current load current $I_{LOAD}$. When operating in the voltage load control mode, the LED driver 100 may control the amount of power delivered to the LED light source 102 using the PWM dimming mode and/or the PFM dimming mode. The LED driver 100 may control the amount of power delivered to the LED light source 102 in response to a digital message, which may be received from a communication circuit, for example as described herein.

Figure 2:
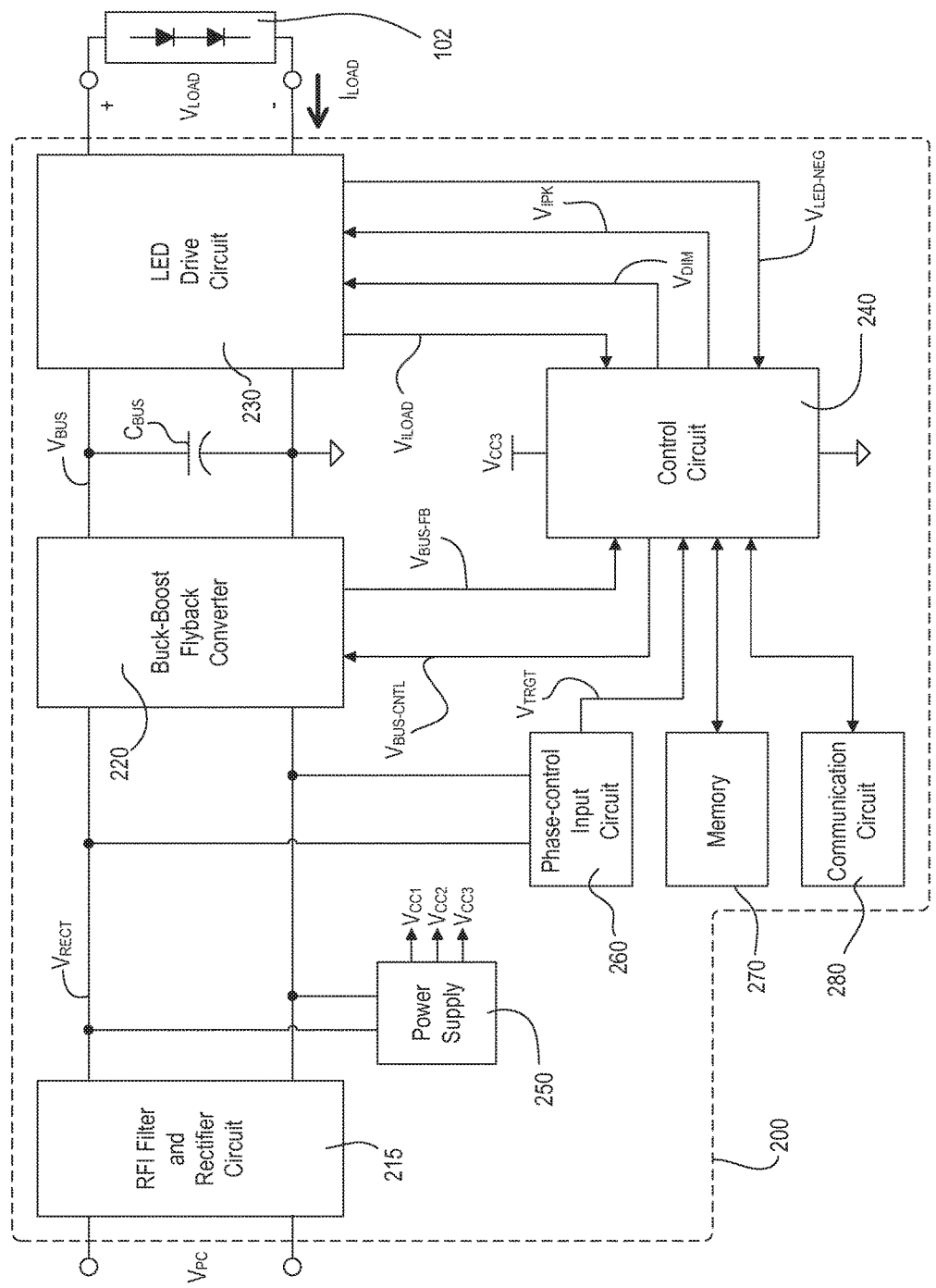
FIG. 2 is a block diagram of an example of an LED driver for controlling the intensity of an LED light source.

FIG. 2 is a block diagram of an example of an LED driver for controlling an LED light source. An LED driver 200 may comprise a radio-frequency (RFI) filter and rectifier circuit 215, a buck-boost flyback converter 220, a bus capacitor $C_{BUS}$, an LED drive circuit 230, a control circuit 240, a power supply 250, a phase-control input circuit 260, memory 270, and/or a communication circuit 280. The LED driver 200 may be an example of the LED driver 100 of FIG. 1. As such, the LED driver 200 may be used within the system 108 of FIG. 1. The LED driver 200 may control an LED light source, such as the LED light source 102.

The RFI filter and rectifier circuit 215 may receive the phase-control signal $V_{PC}$ from a dimmer switch (e.g., the dimmer switch 106 of FIG. 1). The RFI filter and rectifier circuit 215 may minimize the noise provided on an AC power source (e.g., the AC power source 104 of FIG. 1). The RFI filter and rectifier circuit 215 may generate a rectified voltage $V_{RECT}$. The buck-boost flyback converter 220 may receive the rectified voltage $V_{RECT}$. The buck-boost flyback converter 220 may generate a variable direct-current (DC) bus voltage $V_{BUS}$ across the bus capacitor $C_{BUS}$. The buck-boost flyback converter 220 may provide electrical isolation between the AC power source and the LED light source 102. The buck-boost flyback converter 220 may operate as a power factor correction (PFC) circuit to adjust the power factor of the LED driver 200 towards a power factor of one. The buck-boost flyback converter 220 may be a power converter circuit. Although illustrated as the buck-boost flyback converter 220, the LED driver 200 may comprise any suitable power converter circuit for generating an appropriate bus voltage $V_{BUS}$, such as, for example, a boost converter, a buck converter, a single-ended primary-inductor converter (SEPIC), a Ćuk converter, or other suitable power converter circuit. The bus voltage $V_{BUS}$ may be characterized by some voltage ripple as the bus capacitor $C_{BUS}$ periodically charges and discharges.

The LED drive circuit 230 may be a load regulation circuit. The LED drive circuit 230 may receive the bus voltage $V_{BUS}$. The LED drive circuit 230 may control the amount of power delivered to the LED light source 102 so as to control the intensity of the LED light source 102. The LED drive circuit 230 may comprise a controllable-impedance circuit, such as a linear regulator, for example, as described herein. The LED drive circuit 230 may comprise a switching regulator, such as a buck converter for example. Examples of various embodiments of LED drive circuits 230 are described in U.S. patent application Ser. No. 12/813,908, filed Jun. 11, 2010, entitled LOAD CONTROL DEVICE FOR A LIGHT-EMITTING DIODE LIGHT SOURCE, the entire disclosure of which is hereby incorporated by reference.

The control circuit 240 may control the operation of the buck-boost flyback converter 220 and/or the LED drive circuit 230. The control circuit 240 may comprise, for example, a controller or any other suitable processing device, such as, for example, a microcontroller, a programmable logic device (PLD), a microprocessor, an application specific integrated circuit (ASIC), or a field-programmable gate array (FPGA). The power supply 250 may receive the rectified voltage $V_{RECT}$. The power supply 250 may generate a plurality of direct-current (DC) supply voltages for powering the circuitry of the LED driver 200, for example, using the rectified voltage $V_{RECT}$. For example, the power supply 250 may generate a first non-isolated supply voltage $V_{CC1}$ (e.g., approximately 14 volts) for powering the control circuitry of the buck-boost flyback converter 220, a second isolated supply voltage $V_{CC2}$ (e.g., approximately 9 volts)

for powering the control circuitry of the LED drive circuit 230, and/or a third non-isolated supply voltage $V_{CC3}$ (e.g., approximately 5 volts) for powering the control circuit 240.

The control circuit 240 may be coupled to the phase-control input circuit 260. The phase-control input circuit 260 may generate a target intensity control signal $V_{TRGT}$. The target intensity control signal $V_{TRGT}$ may comprise, for example, a square-wave signal having a duty cycle $DC_{TRGT}$, which may be dependent upon the conduction period $T_{CON}$ of the phase-control signal $V_{PC}$ received from a dimmer switch (e.g., the dimmer switch 106 of FIG. 1). The duty cycle $DC_{TRGT}$ may be representative of the target intensity $L_{TRGT}$ of the LED light source 102. The target intensity control signal $V_{TRGT}$ may comprise a DC voltage having a magnitude dependent upon the conduction period $T_{CON}$ of the phase-control signal $V_{PC}$, and thus representative of the target intensity $L_{TRGT}$ of the LED light source 102.

The control circuit 240 may be coupled to the memory 270. The memory 270 may store the operational characteristics of the LED driver 200 (e.g., the load control mode, the dimming mode, the magnitude of the rated load voltage or current, and/or the like). The communication circuit 280 may be coupled to, for example, a wired communication link or a wireless communication link, such as a radio-frequency (RF) communication link or an infrared (IR) communication link. The control circuit 240 may update the target intensity $L_{TRGT}$ of the LED light source 102 and/or the operational characteristics stored in the memory 270 in response to digital messages received via the communication circuit 280. For example, the LED driver 200 may receive a full conduction AC waveform from the AC power source (i.e., not the phase-control signal $V_{PC}$ from the dimmer switch) and may determine the target intensity $L_{TRGT}$ for the LED light source 102 from the digital messages received via the communication circuit 280.

The control circuit 240 may manage the operation of the buck-boost flyback converter 220 and/or the LED drive circuit 230 to control the intensity of the LED light source 102. The control circuit 240 may receive a bus voltage feedback signal $V_{BUS-FB}$, which may be representative of the magnitude of the bus voltage $V_{BUS}$, from the buck-boost flyback converter 220. The control circuit 240 may provide a bus voltage control signal $V_{BUS-CNTL}$ to the buck-boost flyback converter 220 for controlling the magnitude of the bus voltage $V_{BUS}$ to a target bus voltage $V_{BUS-TRGT}$ (e.g., from approximately 8 volts to 60 volts). The LED drive circuit 230 may control a peak magnitude $I_{PK}$ of the load current $I_{LOAD}$ conducted through the LED light source 102 between a minimum load current $I_{LOAD-MIN}$ and a maximum load current $I_{LOAD-MAX}$ (e.g., when operating in the current load control mode), for example, in response to a peak current control signal $V_{IPK}$ provided by the control circuit 240. The control circuit 240 may receive a load current feedback signal $V_{ILOAD}$, which is representative of an average magnitude $I_{AVE}$ of the load current $I_{LOAD}$ flowing through the LED light source 102. The control circuit 240 may receive a regulator voltage feedback signal $V_{REG-FB}$, which is representative of the magnitude of a regulator voltage $V_{REG}$ (i.e., a controllable-impedance voltage) across the linear regulator of the LED drive circuit 230, for example, as described herein.

The control circuit 240 may control the LED drive circuit 230 to control the amount of power delivered to the LED light source 102 using the current load control mode of operation and/or the voltage load control mode of operation. During the current load control mode, the LED drive circuit 230 may regulate the peak magnitude $I_{PK}$ of the load current $I_{LOAD}$ through the LED light source 102 to control the average magnitude $I_{AVE}$ to a target load current $I_{TRGT}$ in response to the load current feedback signal $V_{ILOAD}$ (i.e., using closed loop control). The target load current $I_{TRGT}$ may be stored in the memory 270. The target load current $I_{TRGT}$ may be programmed to be any specific magnitude depending upon the LED light source 102.

To control the intensity of the LED light source 102 during the current load control mode, the control circuit 240 may control the LED drive circuit 230 to adjust the amount of power delivered to the LED light source 102 using the PWM dimming technique, the PFM dimming technique, and/or the CCR dimming technique. Using the PWM dimming technique, the control circuit 240 may control the peak magnitude $I_{PK}$ of the load current $I_{LOAD}$ through the LED light source 102 to the target load current $I_{TRGT}$. Using the PWM dimming technique, the control circuit 240 may pulse-width modulate the load current $I_{LOAD}$ to dim the LED light source 102 and achieve the target load current $I_{TRGT}$. For example, the LED drive circuit 230 may control (i.e., adjust) a duty cycle $DC_{ILOAD}$ of the load current $I_{LOAD}$ in response to a duty cycle $DC_{DIM}$ of a dimming control signal $V_{DIM}$ provided by the control circuit 240. Further, when using the PWM dimming technique, the LED drive circuit 230 may maintain a frequency $f_{ILOAD}$ of the load current $I_{LOAD}$ in response to a frequency $f_{DIM}$ of the dimming control signal $V_{DIM}$ provided by the control circuit 240. The intensity of the LED light source 102 may be dependent upon the duty cycle $DC_{ILOAD}$ and the frequency $f_{ILOAD}$ of the pulse-width modulated load current $I_{LOAD}$.

Using the PFM dimming technique, the control circuit 240 may control the peak magnitude $I_{PK}$ of the load current $I_{LOAD}$ through the LED light source 102 to the target load current $I_{TRGT}$. Using the PFM dimming technique, the control circuit 240 may pulse frequency modulate the load current $I_{LOAD}$ to dim the LED light source 102 and achieve the target load current $I_{TRGT}$. For example, the LED drive circuit 230 may control (i.e., adjust) a frequency $f_{ILOAD}$ of the load current $I_{LOAD}$ in response to a frequency $f_{DIM}$ of a dimming control signal $V_{DIM}$ provided by the control circuit 240. Further, when using the PFM dimming technique, the LED drive circuit 230 may maintain the duty cycle $DC_{ILOAD}$ of the load current $I_{LOAD}$ in response to a duty cycle $DC_{DIM}$ of the dimming control signal $V_{DIM}$ provided by the control circuit 240. The intensity of the LED light source 102 may be dependent upon the duty cycle $DC_{ILOAD}$ and the frequency $f_{ILOAD}$ of the pulse-width modulated load current $I_{LOAD}$.

Using the CCR technique, the control circuit 240 may not pulse-width modulate or pulse-frequency modulate the load current $I_{LOAD}$. Using the CCR technique, the control circuit 240 may adjust the magnitude of the target load current $I_{TRGT}$ so as to adjust the average magnitude $I_{AVE}$ of the load current $I_{LOAD}$ through the LED light source 102. The average magnitude $I_{AVE}$ of the load current $I_{LOAD}$ through the LED light source 102 may be equal to the peak magnitude $I_{PK}$ of the load current $I_{LOAD}$ in the CCR dimming mode.

During the voltage load control mode, the LED drive circuit 230 may regulate the DC voltage of the load voltage $V_{LOAD}$ across the LED light source 102 to a target load voltage $V_{TRGT}$. The target load voltage $V_{TRGT}$ may be stored in the memory 270. The target load voltage $V_{TRGT}$ may be programmed to be any specific magnitude depending upon the LED light source 102. The control circuit 240 may dim the LED light source 102 using the PWM dimming technique and/or the PFM dimming technique during the voltage load control mode. For example, using the PWM dimming technique, the control circuit 240 may adjust a duty cycle $DC_{VLOAD}$ of the load voltage $V_{LOAD}$ in response to a duty cycle $DC_{DIM}$ of the dimming control signal $V_{DIM}$ to dim the LED light source 102. Using the PFM dimming technique, the control circuit 240 may adjust the frequency $f_{ILOAD}$ of the load voltage $V_{LOAD}$ in response to a frequency $f_{DIM}$ of the dimming control signal $V_{DIM}$ to dim the LED light source 102. An example of a configuration procedure for the LED driver 200 is described in greater detail in U.S. patent application Ser. No. 12/813,989, filed Jun. 11, 2010, entitled CONFIGURABLE LOAD CONTROL DEVICE FOR LIGHT-EMITTING DIODE LIGHT SOURCES, the entire disclosure of which is hereby incorporated by reference.

Figure 3A:
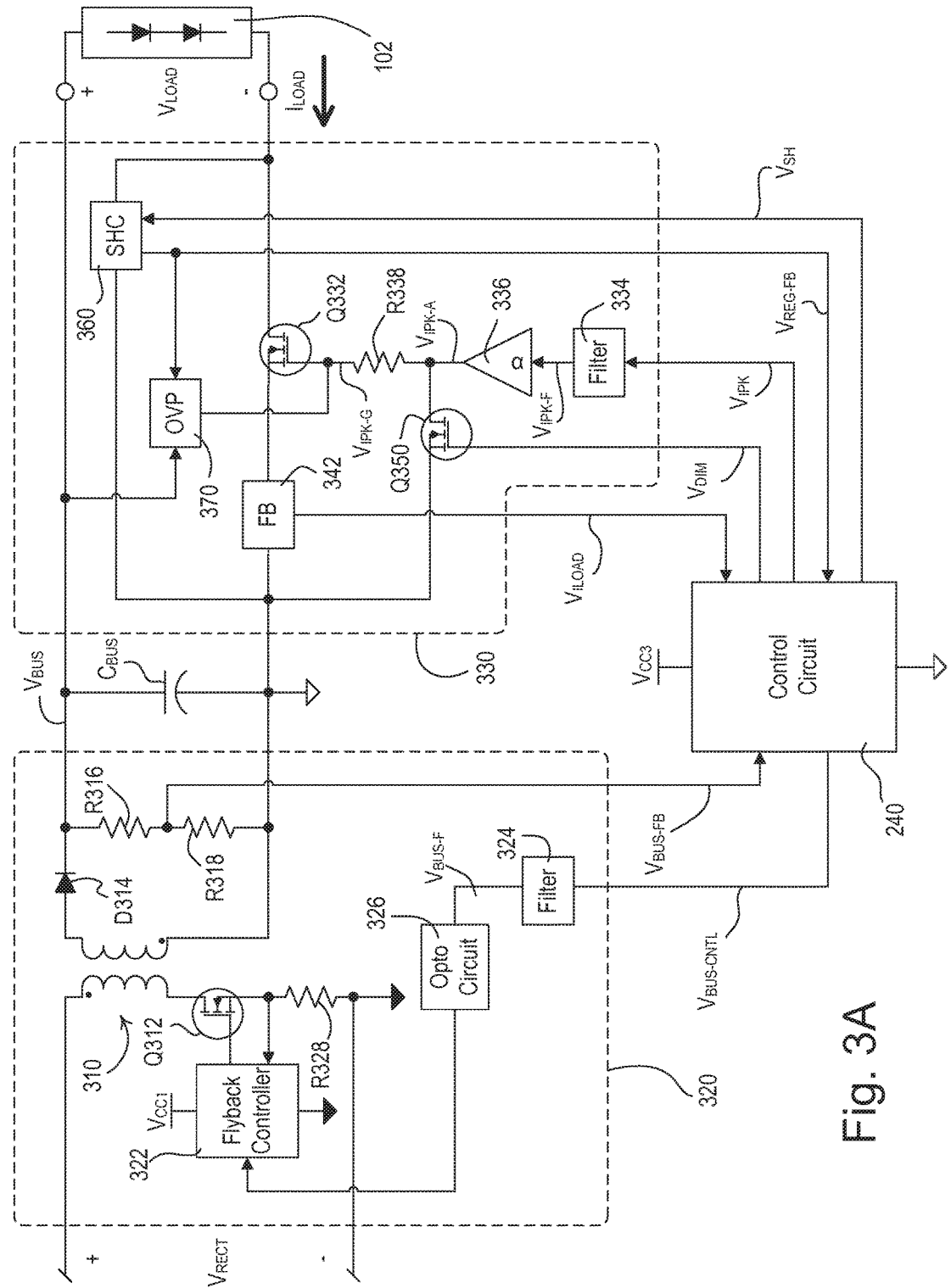
FIG. 3A is a schematic diagram of an example of a flyback converter and an LED drive circuit.

FIG. 3A is a schematic diagram of an example of a flyback converter and an LED drive circuit. A flyback converter 320 may comprise a flyback transformer 310, a field-effect transistor (FET) Q312, a diode D314, a resistor R316, a resistor R318, a flyback control circuit 322, a filter circuit 324, an optocoupler circuit 326, and/or a feedback resistor R328. An LED drive circuit 330 may comprise a regulation field-effect transistor (FET) Q332, a filter circuit 334, an amplifier circuit 336, a gate resistor R338, a feedback circuit 342, a dimming FET Q350, a sample and hold circuit (SHC) 360, and/or an overvoltage protection circuit 370. The flyback converter 320 may be an example of the buck-boost flyback converter 220 of FIG. 2. The LED drive circuit 330 may be an example of the LED drive circuit 230 of FIG. 2. As such, the LED driver 100 of FIG. 1 and/or the LED driver 200 of FIG. 2 may comprise the flyback converter 320 and/or the LED drive circuit 330.

The flyback transformer 310 may comprise a primary winding and a secondary winding. The primary winding may be coupled in series with the field-effect transistor (FET) Q312. Although illustrated as the field-effect transistor (FET) Q312, the primary winding of the flyback transformer 310 may be coupled in series with any flyback switching transistor or other suitable semiconductor switch. The secondary winding of the flyback transformer 310 may be coupled to the bus capacitor $C_{BUS}$ via the diode D314. The bus voltage feedback signal $V_{BUS-FB}$ may be generated by a voltage divider comprising the resistors R316, R318 coupled across the bus capacitor $C_{BUS}$.

The flyback control circuit 322 may receive the bus voltage control signal $V_{BUS-CNTL}$ from the control circuit 240, for example, via the filter circuit 324 and the optocoupler circuit 326. The filter circuit 324 and the optocoupler circuit 326 may provide electrical isolation between the flyback converter 320 and the control circuit 240. The flyback control circuit 322 may comprise, for example, part number TDA4863, manufactured by Infineon Technologies. The filter circuit 324 may generate a filtered bus voltage control signal $V_{BUS-F}$ using the bus voltage control signal $V_{BUS-CNTL}$. For example, the filter circuit 324 may comprise a two-stage resistor-capacitor (RC) filter for generating the filtered bus voltage control signal $V_{BUS-F}$. The filtered bus voltage control signal $V_{BUS-F}$ may comprise a DC magnitude dependent upon the duty cycle $DC_{BUS}$ of the bus voltage control signal $V_{BUS-CNTL}$. The flyback control circuit 322 may receive a control signal representative of the current through the FET Q312 from the feedback resistor R328, which is coupled in series with the FET Q312.

The flyback control circuit 322 may control the FET Q312 to selectively conduct current through the flyback transformer 310 to generate the bus voltage $V_{BUS}$. The flyback control circuit 322 may render the FET Q312 conductive and non-conductive at a high frequency (e.g., approximately 150 kHz or less), for example, to control the magnitude of the bus voltage $V_{BUS}$ in response to the DC magnitude of the filtered bus voltage control signal $V_{BUS-F}$ and the magnitude of the current through the FET Q312. For example, the control circuit 240 may increase the duty cycle $DC_{BUS}$ of the bus voltage control signal $V_{BUS-CNTL}$ such that the DC magnitude of the filter bus voltage control signal $V_{BUS-F}$ increases in order to decrease the magnitude of the bus voltage $V_{BUS}$. The control circuit 240 may decrease the duty cycle $DC_{BUS}$ of the bus voltage control signal $V_{BUS-CNTL}$ to increase the magnitude of the bus voltage $V_{BUS}$. The filter circuit 324 may provide a digital-to-analog conversion for the control circuit 240 (i.e., from the duty cycle $DC_{BUS}$ of the bus voltage control signal $V_{BUS-CNTL}$ to the DC magnitude of the filtered bus voltage control signal $V_{BUS-CNTL}$). The control circuit 240 may comprise a digital-to-analog converter (DAC) for generating (e.g., directly generating) the bus voltage control signal $V_{BUS-CNTL}$ having an appropriate DC magnitude for controlling the magnitude of the bus voltage $V_{BUS}$.

Figure 3B:
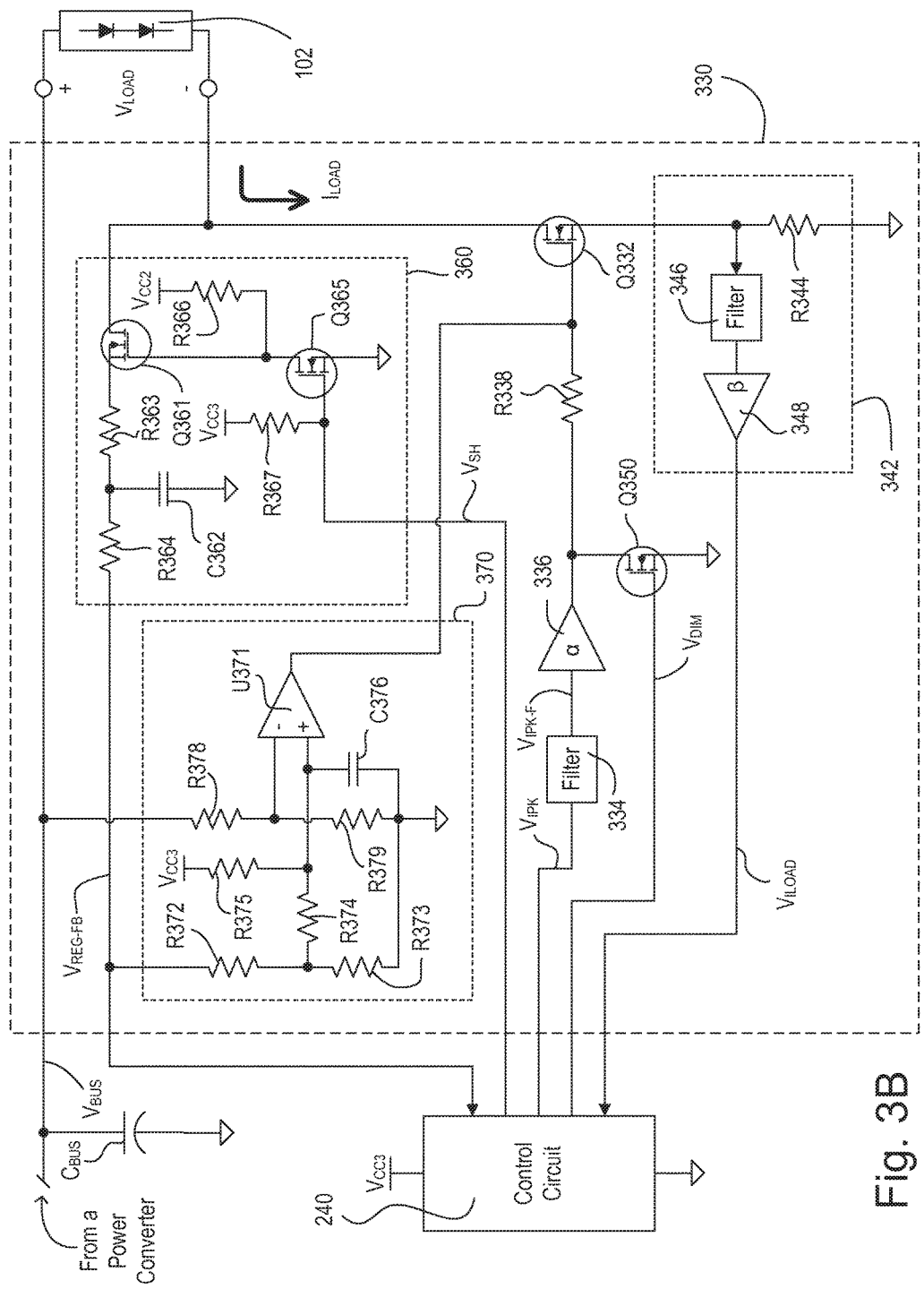
FIG. 3B is a schematic diagram showing an example the LED drive circuit of FIG. 3A.

FIG. 3B is a schematic diagram of an example of the LED drive circuit of FIG. 3A. The LED drive circuit 330 may comprise the regulation field-effect transistor (FET) Q332, the filter circuit 334, the amplifier circuit 336, the gate resistor R338, the feedback circuit 342, the dimming FET Q350, the sample and hold circuit 360, and/or the overvoltage protection circuit 370. The feedback circuit 342 may comprise a feedback resistor R344, a filter circuit 346, and/or an amplifier circuit 348. The sample and hold circuit 360 may comprise a FET Q361, a capacitor C362, a resistor R363, a resistor R364, a FET Q365, a resistor R366, and/or a resistor R367. The overvoltage protection circuit 370 may comprise a comparator U371, a resistor R372, a resistor R373, a resistor R374, a resistor R375, a filtering capacitor C376, a resistor R378, and/or a resistor R379.

The LED drive circuit 330 may comprise a linear regulator (i.e., a controllable-impedance circuit) including the regulation field-effect transistor (FET) Q332 coupled in series with the LED light source 102 for conducting the load current $I_{LOAD}$. Although illustrated as the FET Q332, the LED drive circuit 330 may comprise any power semiconductor switch coupled in series with the LED light source 102 for conducting the load current $I_{LOAD}$. The regulation FET Q332 may comprise a bipolar junction transistor (BJT), an insulated-gate bipolar transistor (IGBT), or any suitable transistor. The peak current control signal $V_{IPK}$ provided by the control circuit 240 may be coupled to the gate of the regulation FET Q332 through the filter circuit 334, the amplifier circuit 336, and the gate resistor R338. The control circuit 240 may control the duty cycle $DC_{IPK}$ of the peak current control signal $V_{IPK}$ to control the peak magnitude $I_{PK}$ of the load current $I_{LOAD}$ conducted through the LED light source 102 to the target load current $I_{TRGT}$.

The filter circuit 334 (e.g., a two-stage RC filter) may provide digital-to-analog conversion for the control circuit 240, for example, by generating a filtered peak current control signal $V_{IPK-F}$. The filtered peak current control signal $V_{IPK-F}$ may have a DC magnitude dependent upon the duty cycle $DC_{IPK}$ of the peak current control signal $V_{IPK}$ and may be representative of the magnitude of the target load current $I_{TRGT}$. The control circuit 240 may comprise a DAC for generating (e.g., directly generating) the peak current control signal $V_{IPK}$ having an appropriate DC magnitude for controlling the peak magnitude $I_{PK}$ of the load current $I_{LOAD}$. The amplifier circuit 336 may generate an amplified peak current control signal $V_{IPK-A}$. The amplifier circuit 336 may provide the amplified peak current control signal $V_{IPK-A}$ to the gate of the regulation transistor Q332 through the resistor R338, such that a drive signal at the gate of the regulation transistor Q332, e.g., a gate voltage $V_{IPK-G}$, has a magnitude dependent upon the target load current $I_{TRGT}$. The amplifier circuit 336 may comprise a standard non-inverting operational amplifier circuit having, for example, a gain α of approximately three.

The feedback resistor R344 of the feedback circuit 342 may be coupled in series with the regulation FET Q332, for example, such that the voltage generated across the feedback resistor is representative of the magnitude of the load current $I_{LOAD}$. For example, the feedback resistor R344 may have a resistance of approximately 0.0375Ω. The filter circuit 346 (e.g., a two-stage RC filter) of the feedback circuit 342 may be coupled between the feedback resistor R344 and the amplifier circuit 348 (e.g., a non-inverting operational amplifier circuit having a gain β of approximately 20). The amplifier circuit 348 may have a variable gain, which for example, may be controlled by the control circuit 240 and could range between approximately 1 and 1000. The amplifier circuit 348 may generate the load current feedback signal $V_{ILOAD}$. The amplifier circuit 348 may provide the load current feedback signal $V_{ILOAD}$ to the control circuit 240. The load current feedback signal $V_{ILOAD}$ may be representative of an average magnitude $I_{AVE}$ of the load current $I_{LOAD}$, e.g., $$I_{AVE}=V_{ILOAD}/(\beta \cdot R_{FB}), \quad \text{(Equation 1)}$$

wherein $R_{FB}$ is the resistance of the feedback resistor R344. Examples of other feedback circuits for the LED drive circuit 330 are described in greater detail in U.S. patent application Ser. No. 12/814,026, filed Jun. 11, 2010, entitled CLOSED-LOOP LOAD CONTROL CIRCUIT HAVING A WIDE OUTPUT RANGE, the entire disclosure of which is hereby incorporated by reference.

When operating in the current load control mode, the control circuit 240 may control the regulation FET Q332 to operate in the linear region, such that the peak magnitude $I_{PK}$ of the load current $I_{LOAD}$ is dependent upon the DC magnitude of the gate voltage $V_{IPK-G}$ at the gate of the regulation FET Q332. In other words, the regulation FET Q332 may provide a controllable-impedance in series with the LED light source 102. If the magnitude of the regulator voltage $V_{REG}$ drops too low, the regulation FET Q332 may be driven into the saturation region, such that the regulation FET Q332 becomes fully conductive and the control circuit 240 is no longer able to control the peak magnitude $I_{PK}$ of the load current $I_{LOAD}$. Therefore, the control circuit 240 may adjust the magnitude of the bus voltage $V_{BUS}$ to prevent the magnitude of the regulator voltage $V_{REG}$ from dropping below a minimum regulator voltage threshold $V_{REG-MIN}$ (e.g., approximately 0.4 volts). In addition, the control circuit 240 may adjust the magnitude of the bus voltage $V_{BUS}$ to control the magnitude of the regulator voltage $V_{REG}$ to be less a maximum regulator voltage threshold $V_{REG-MAX}$ (e.g., approximately 0.6 volts), for example, to prevent the power dissipated in regulation FET Q332 from becoming too large, thus increasing the total efficiency of the LED driver (e.g., the LED driver 100, the LED driver 200, and/or the like). Since the regulator voltage $V_{REG}$ may have some ripple (e.g., which may be due to the ripple of the bus voltage $V_{BUS}$), the control circuit 240 may determine the minimum value of the regulator voltage $V_{REG}$ during a period of time and to compare this minimum value of the regulator voltage $V_{REG}$ to the regulator voltage threshold $V_{REG-MIN}$ and the maximum regulator voltage threshold $V_{REG-MAX}$.

When operating in the voltage load control mode, the control circuit 240 may drive the regulation FET Q332 into the saturation region, for example, such that the magnitude of the load voltage $V_{LOAD}$ is approximately equal to the magnitude of the bus voltage $V_{BUS}$ (e.g., minus the small voltage drops due to the on-state drain-source resistance $R_{DS-ON}$ of the FET regulation Q332 and the resistance of the feedback resistor R344).

The dimming FET Q350 of the LED drive circuit 330 may be coupled between the gate of the regulation FET Q332 and circuit common. The dimming control signal $V_{DIM}$ from the control circuit 240 may be provided to the gate of the dimming FET Q350. When the dimming FET Q350 is rendered conductive, the regulation FET Q332 may be rendered non-conductive. When the dimming FET Q350 is rendered non-conductive, the regulation FET Q332 may be rendered conductive.

While using the PWM dimming technique during the current load control mode, the control circuit 240 may adjust the duty cycle $DC_{DIM}$ of the dimming control signal $V_{DIM}$ (e.g., to adjust the length of an on time $t_{ON}$ that the regulation FET Q332 is conductive) to control when the regulation FET Q332 conducts the load current $I_{LOAD}$ and to control the intensity of the LED light source 102. For example, the control circuit 240 may generate the dimming control signal $V_{DIM}$ using a constant frequency $f_{DIM}$ (e.g., approximately in the range of 500-550 Hz), such that the on time $t_{ON}$ of the dimming control signal $V_{DIM}$ is dependent upon the duty cycle $DC_{DIM}$, i.e., $$t_{ON}=(1-DC_{DIM})/f_{DIM}. \quad \text{(Equation 2)}$$

As the duty cycle $DC_{DIM}$ of the dimming control signal $V_{DIM}$ increases, the duty cycle $DC_{ITRGT}$, $DC_{VTRGT}$ of the corresponding load current $I_{LOAD}$ or load voltage $V_{LOAD}$ decreases, and vice versa.

While using the PFM dimming technique during the current load control mode, the control circuit 240 may adjust the frequency $f_{DIM}$ of the dimming control signal $V_{DIM}$ to control the frequency at which the regulation FET Q332 conducts the load current $I_{LOAD}$ and to control the intensity of the LED light source 102. For example, the control circuit 240 may generate the dimming control signal $V_{DIM}$ using a constant on time $t_{ON}$, such that the frequency $f_{DIM}$ of the dimming control signal $V_{DIM}$ is dependent upon the duty cycle $DC_{DIM}$, i.e., $$f_{DIM}=(1-DC_{DIM})/t_{ON}. \quad \text{(Equation 3)}$$

As the duty cycle $DC_{DIM}$ of the dimming control signal $V_{DIM}$ increases, the duty cycle $DC_{ITRGT}$, $DC_{VTRGT}$ of the corresponding load current $I_{LOAD}$ or load voltage $V_{LOAD}$ decreases, and vice versa.

When using the PWM dimming technique and/or the PFM dimming technique in the current load control mode, the control circuit 240 may control the peak magnitude $I_{PK}$ of the load current $I_{LOAD}$ in response to the load current feedback signal $V_{ILOAD}$ to maintain the average magnitude $I_{AVE}$ of the load current $I_{LOAD}$ constant (i.e., at the target lamp current $I_{TRGT}$). The control circuit 240 may calculate the peak magnitude $I_{PK}$ of the load current $I_{LOAD}$ from the load current feedback signal $V_{ILOAD}$ and the duty cycle $DC_{DIM}$ of the dimming control signal $V_{DIM}$, i.e., $$I_{PK}=I_{AVE}/(1-DC_{DIM}). \quad \text{(Equation 4)}$$

The load current feedback signal $V_{ILOAD}$ may be representative of the average magnitude $I_{AVE}$ of the load current $I_{LOAD}$. When using the CCR dimming technique during the current load control mode, the control circuit 240 may maintain the duty cycle $DC_{DIM}$ of the dimming control signal $V_{DIM}$ at a high-end dimming duty cycle $DC_{HE}$ (e.g., approximately 0%, such that the FET Q332 is always conductive) and/or may adjust the target load current $I_{TRGT}$ (e.g., via the duty cycle $DC_{IPK}$ of the peak current control signal $V_{IPK}$) to control the intensity of the LED light source 102.

The regulator voltage feedback signal $V_{REG\text{-}FB}$ may be generated by the sample and hold circuit 360 of the LED drive circuit 330. The regulator voltage feedback signal $V_{REG\text{-}FB}$ may be representative of the regulator voltage $V_{REG}$ generated across the series combination of the regulation FET Q332 and the feedback resistor R344 when the regulation FET Q332 is conducting the load current $I_{LOAD}$. The FET Q361 of the sample and hold circuit 360 may be coupled to the junction of the LED light source 102 and the regulation FET Q332. Although illustrated as the FET Q361, the sample and hold circuit 360 may include any sampling transistor. When the FET Q361 is rendered conductive, the capacitor C362 may charge to approximately the magnitude of the regulator voltage $V_{REG}$ through the resistor R363. The capacitor C362 may have a capacitance of approximately 1 µF. The resistor R363 may have a resistance of approximately 10Ω. The capacitor C362 may be coupled to the control circuit 240 through the resistor R364 for providing the regulator voltage feedback signal $V_{REG\text{-}FB}$ to the control circuit 240. The resistor R364 may have a resistance of approximately 12.1 kΩ. The gate of the FET Q361 may be coupled to circuit common through the FET Q365 and to the second isolated supply voltage $V_{CC2}$ through the resistor R366. The resistor R366 may have a resistance of approximately 20 kΩ. The gate of the second FET Q365 may be coupled to the third non-isolated supply voltage $V_{CC3}$ through the resistor R367. The resistor R367 may have a resistance of approximately 10 kΩ.

The control circuit 240 may generate a sample and hold control signal $V_{SH}$ that is operatively coupled to the control input (i.e., the gate) of the FET Q365 of the sample and hold circuit 360. The sample and hold control signal $V_{SH}$ may be coupled to the FET Q365 to render the FET Q361 conductive and non-conductive to controllably charge the capacitor C362 to the magnitude of the regulator voltage $V_{REG}$. For example, when using the PWM dimming mode and/or the PFM dimming mode, the control circuit 240 may render the FET Q361 conductive during an on time $t_{ON}$ (e.g., each on time $t_{ON}$) of the dimming control signal $V_{DIM}$ (i.e., when the dimming FET Q350 is non-conductive and the regulation FET Q332 is conductive). When the FET Q361 is rendered conductive during the on time $t_{ON}$ of the dimming control signal $V_{DIM}$, the regulator voltage feedback signal $V_{REG\text{-}FB}$ may be representative of the magnitude of the regulator voltage $V_{REG}$ when the regulation FET Q332 is conducting the load current $I_{LOAD}$. When the control circuit 240 is using the CCR dimming mode, the FET Q361 may be rendered conductive at all times.

The overvoltage protection circuit 370 of the LED drive circuit 330 may be responsive to the magnitude of the bus voltage $V_{BUS}$ and/or the magnitude of the regulator feedback voltage $V_{REG\text{-}FB}$. The difference between the magnitudes of the bus voltage $V_{BUS}$ and the regulator feedback voltage $V_{REG\text{-}FB}$ may be representative of the magnitude of the load voltage $V_{LOAD}$ across the LED light source 102. The comparator U371 of the overvoltage protection circuit 370 may have an output coupled to the gate of the regulation FET Q332 for rendering the FET non-conductive if the load voltage $V_{LOAD}$ exceeds an overvoltage threshold. The overvoltage protection circuit 370 may comprise a resistor divider that includes the resistors R372, R373. The resistor divider that includes the resistors R372, R373 may receive the regulator feedback voltage $V_{REG\text{-}FB}$. The junction of the resistors R372, R373 may be coupled to the non-inverting input of the comparator U371 through the resistor R374. The non-inverting input may be coupled to the third non-isolated supply voltage $V_{CC3}$ through the resistor R375 and/or to circuit common through the filtering capacitor C376. The filtering capacitor C376 may have a capacitance of approximately 10 µF.

The overvoltage protection circuit may comprise a resistor divider that includes the resistors 3478, 379. The resistor divider that includes resistors R378, R379 may be coupled between the bus voltage $V_{BUS}$ and circuit common. The junction of the resistors R378, R379 may be coupled to the inverting input of the comparator U371, such that, for example, the magnitude of the voltage at the non-inverting input of the comparator U371 may be responsive to the regulator feedback voltage $V_{REG\text{-}FB}$ and/or such that the magnitude of the voltage at the inverting input of the comparator U371 may be responsive to the bus voltage $V_{BUS}$. The comparator U371 may operate to render the regulation FET Q332 non-conductive if the difference between the magnitudes of the bus voltage $V_{BUS}$ and the regulator feedback voltage $V_{REG\text{-}FB}$ exceeds the overvoltage threshold.

The resistances of the resistors R372, R373, R374, R375, R378, R379 of the overvoltage protection circuit 370 may be determined such that the voltage at the non-inverting input of the comparator U371 is proportional to the magnitude of the regulator feedback voltage $V_{REG\text{-}FB}$. Accordingly, the magnitude of the bus voltage $V_{BUS}$ that may cause the voltage at the inverting input of the comparator U371 to exceed the voltage at the non-inverting input increases in proportional to the magnitude of the regulator feedback voltage $V_{REG\text{-}FB}$, such that the overvoltage threshold that the load voltage $V_{LOAD}$ exceeds to render the regulation FET Q332 non-conductive remains approximately constant as the magnitude of the regulator feedback voltage $V_{REG\text{-}FB}$ changes. The resistances of the resistors R375, R374 may be greater than the resistances of the resistors R372, R373 to avoid loading the regulator feedback voltage $V_{REG\text{-}FB}$.

Figure 4A:
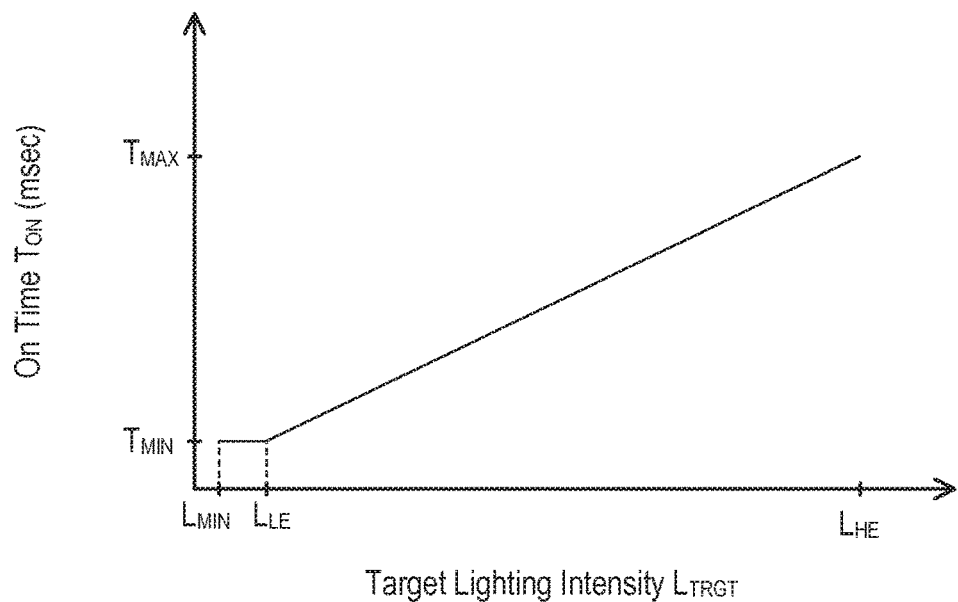
FIG. 4A is a graph that illustrates an example of the relationship between an on-time $T_{ON}$ of a load current of an LED driver and a target lighting intensity $L_{TRGT}$ of an LED light source.
Figure 4B:
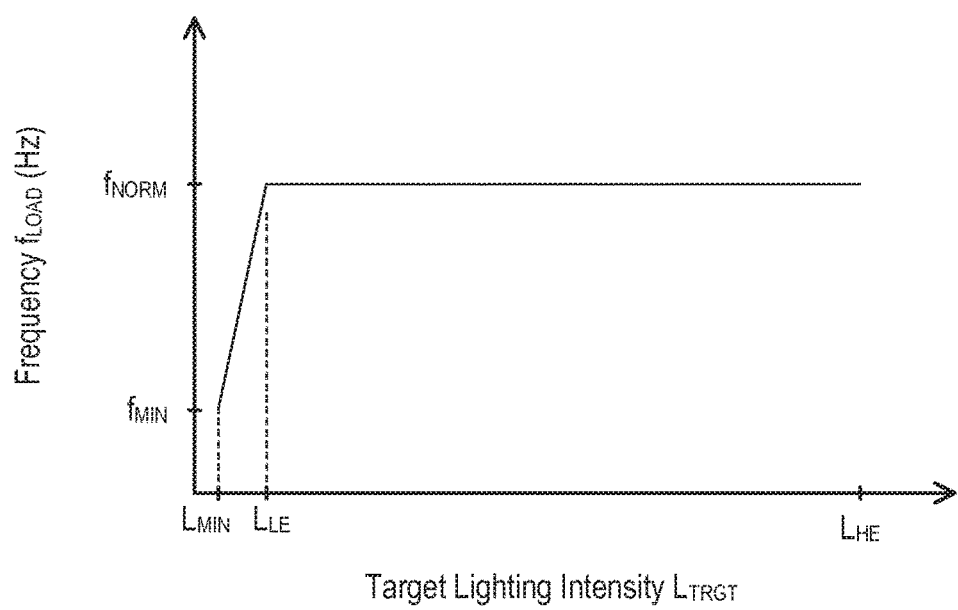
FIG. 4B is a graph that illustrates an example of the relationship between a frequency from) of a load current of an LED driver and a target lighting intensity $L_{TRGT}$ of an LED light source.

FIG. 4A is a graph that illustrates an example of the relationship between an on-time $T_{ON}$ of a load current of an LED driver (e.g., the LED driver 100 of FIG. 1, the LED driver 200 of FIG. 2, and/or the like) and a target lighting intensity $L_{TRGT}$ of an LED light source (e.g., the LED light source 102 and/or the like). FIG. 4B is a graph that illustrates an example of the relationship between a frequency $f_{LOAD}$ of a load current of an LED driver (e.g., the LED driver 100 of FIG. 1, the LED driver 200 of FIG. 2, and/or the like) and a target lighting intensity $L_{TRGT}$ of an LED light source (e.g., the LED light source 102 and/or the like).

Figure 5A:
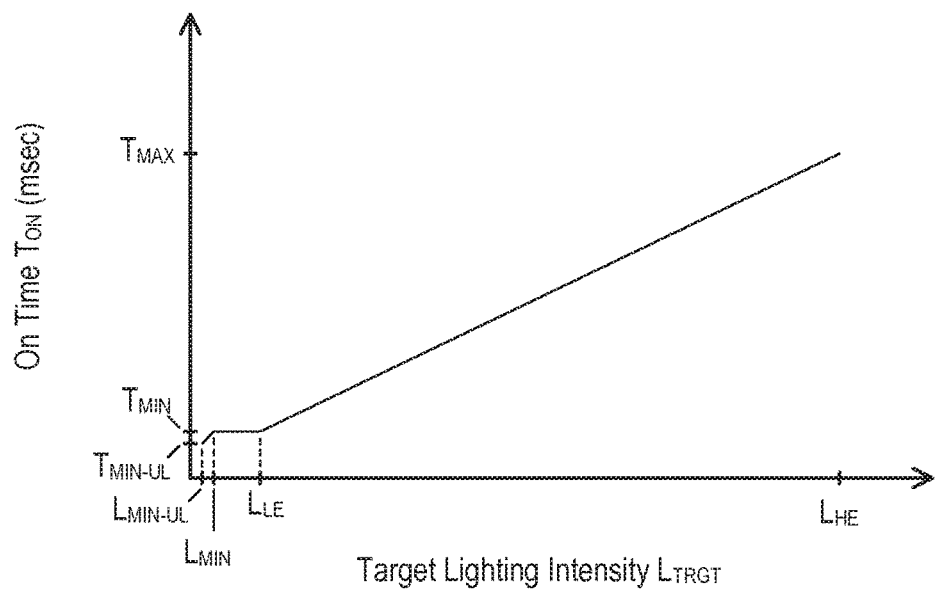
FIG. 5A is a graph that illustrates an example of the relationship between an on-time $T_{ON}$ of a load current of an LED driver and a target lighting intensity $L_{TRGT}$ of an LED light source.
Figure 5B:
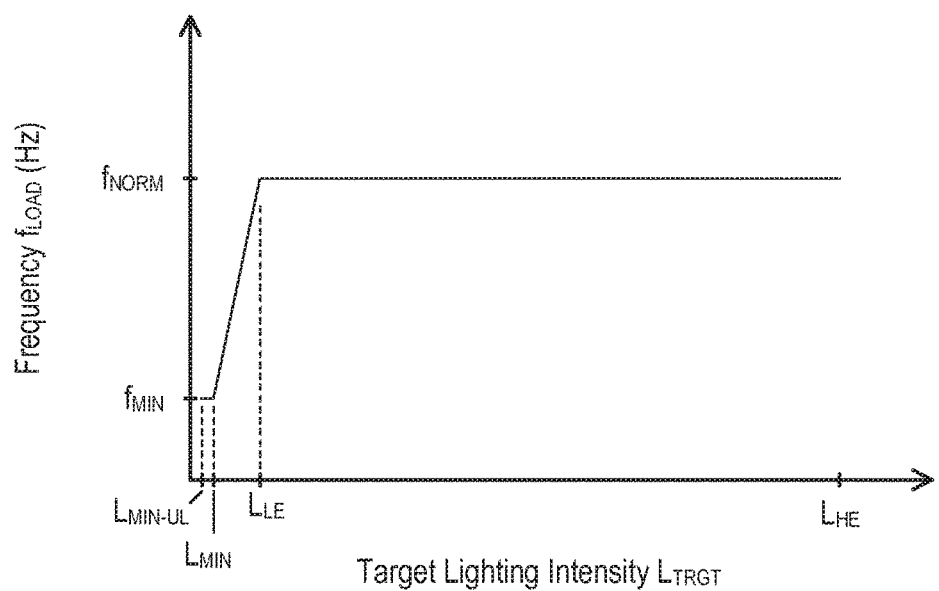
FIG. 5B is a graph that illustrates an example of the relationship between a frequency from) of a load current of an LED driver and a target lighting intensity $L_{TRGT}$ of an LED light source.

FIG. 5A is a graph that illustrates an example of the relationship between an on-time $T_{ON}$ of a load current of an LED driver (e.g., the LED driver 100 of FIG. 1, the LED driver 200 of FIG. 2, and/or the like) and a target lighting intensity $L_{TRGT}$ of an LED light source (e.g., the LED light source 102 and/or the like). FIG. 5B is a graph that illustrates an example of the relationship between a frequency $f_{LOAD}$ of a load current of an LED driver (e.g., the LED driver 100 of FIG. 1, the LED driver 200 of FIG. 2, and/or the like) and a target lighting intensity $L_{TRGT}$ of an LED light source (e.g., the LED light source 102 and/or the like). One or more of the embodiments described with relation to FIGS. 4A, 4B, 5A, and/or 5B may be performed by an LED driver (e.g., the LED driver 100 of FIG. 1, the LED driver 200 of FIG. 2, and/or the like) using a current control mode and/or a voltage control mode.

The control circuit 240 may be configured to control the intensity of the LED light source 102 by pulse width modulating the load current $I_{LOAD}$ when the target intensity is above a predetermined threshold and control the intensity of the LED light source 102 by pulse frequency modulating the load current $I_{LOAD}$ when the target intensity is below the predetermined threshold. The predetermined threshold may be, for example, a low-end intensity $L_{LE}$ (e.g., 1%) as shown in FIGS. 4A-4B and FIGS. 5A-5B. Pulse width modulating the load current $I_{LOAD}$ may comprise maintaining a frequency $f_{LOAD}$ of the load current $I_{LOAD}$ constant and adjusting an on time $T_{ON}$ of the load current $I_{LOAD}$. Pulse frequency modulating the load current $I_{LOAD}$ may comprise maintaining the on time $T_{ON}$ of the load current $I_{LOAD}$ constant and adjusting the frequency $f_{LOAD}$ of the load current $I_{LOAD}$.

When the LED driver is operating in the PWM dimming mode, the control circuit 240 may adjust the duty cycle $DC_{ILOAD}$ of the pulse-width modulated load current $I_{LOAD}$ to dim the LED light source 102 between the high-end intensity $L_{HE}$ (e.g., approximately 100%) and the low-end intensity $L_{LE}$ (e.g., approximately 1%) in response to the phase-control signal $V_{PC}$. For example, the control circuit 240 may render the dimming FET Q350 conductive for an on time $T_{ON}$ and non-conductive for an off time $T_{OFF}$ during a period (e.g., each period) $T_{PWM}$ of the pulse-width modulated load current $I_{LOAD}$. The control circuit 240 may hold a frequency $f_{LOAD}$ of the pulse-width modulated load current $I_{LOAD}$ constant at a normal PWM frequency $f_{NORM}$ (e.g., approximately in the range of 500-550 Hz) and may adjust the length of the on time $T_{ON}$ to dim the LED light source 102 between the high-end intensity $L_{HE}$ and the low-end intensity $L_{LE}$, for example, as shown in FIGS. 4A-4B and FIGS. 5A-5B. For example, the length of the on time $T_{ON}$ may be controlled between a maximum on time $T_{MAX}$ (e.g., approximately 1.8 msec) corresponding to the high-end intensity $L_{HE}$ (e.g., the duty cycle $DC_{ILOAD}$ may equal approximately 100%) of the LED light source 102 and a minimum on time $T_{MIN}$ (e.g., approximately 18 µsec) corresponding to the low-end intensity $L_{LE}$ (e.g., the duty cycle $DC_{ILOAD}$ may equal approximately 1%) of the LED light source 102.

The LED driver may adjust (e.g., fade) the intensity of the LED light source 102 from the present intensity $L_{PRES}$ to off (e.g., 0%) over a fade time period $T_{FADE}$. When fading the intensity of the LED light source 102 to off, the control circuit 240 may adjust the intensity of the LED light source 102 below the low-end intensity $L_{LE}$ (e.g., 1%), for example, to a minimum intensity $L_{MIN}$, to an ultra-low minimum intensity $L_{MIN-UL}$, and/or to off. Hardware limitations of the control circuit 240 (e.g., a minimum pulse width that may be generated by the control circuit) may prevent the length of the on time $T_{ON}$ of the pulse-width modulated load current $I_{LOAD}$ from being adjusted below the minimum on time $T_{MIN}$, for example, when the frequency $f_{LOAD}$ of the pulse-width modulated load current $I_{LOAD}$ is at the normal PWM frequency $f_{NORM}$.

The control circuit 240 may adjust the intensity of the LED light source 102 below the low-end intensity $L_{LE}$ by pulse frequency modulating the load current $I_{LOAD}$. For example, the control circuit 240 may adjust the intensity of the LED light source 102 below the low-end intensity $L_{LE}$ to the minimum intensity $L_{MIN}$ by the maintaining the length of the on time $T_{ON}$ constant at the minimum on time $T_{MIN}$ and decreasing the frequency $f_{LOAD}$ of the pulse-width modulated load current $I_{LOAD}$, for example, as shown in FIGS. 4A-4B and 5A-5B. The control circuit 240 may decrease the intensity of the LED light source 102 from the low-end intensity $L_{LE}$ to the minimum intensity $L_{MIN}$ (e.g., approximately 0.1%) by decreasing the frequency $f_{LOAD}$ from the normal PWM frequency $f_{NORM}$ to a minimum PWM frequency $f_{MIN}$ (e.g., approximately 120 Hz). As such, the control circuit 240 may adjust the intensity of the LED light source 102 by adjusting the length of the on time $T_{ON}$ and maintaining the frequency $f_{LOAD}$ when the target intensity $L_{TRGT}$ is greater than the low-end intensity $L_{LE}$, and by adjusting the frequency $f_{LOAD}$ and maintaining the on time $T_{ON}$ when the target intensity $L_{TRGT}$ is less than the low-end intensity $L_{LE}$. In one or more embodiments, the control circuit 240 may decrease the intensity of the LED light source 102 from the low-end intensity $L_{LE}$ to off by decreasing the frequency $f_{LOAD}$, for example, from the normal PWM frequency $f_{NORM}$ to the minimum PWM frequency $f_{MIN}$.

The control circuit 240 may control the intensity of the LED light source 102 below the minimum intensity $L_{MIN}$ to an ultra-low minimum intensity $L_{MIN-UL}$, for example, as shown in FIGS. 5A-5B. The control circuit 240 may control the intensity of the LED light source 102 below the minimum intensity $L_{MIN}$ to an ultra-low minimum intensity $L_{MIN-UL}$ by pulse width modulating the load current. For example, the control circuit 240 may maintain the frequency $f_{LOAD}$ of the load current $I_{LOAD}$ constant at the minimum PWM frequency $f_{MIN}$ (e.g., approximately 120 Hz) and decrease the on time $T_{ON}$ below the minimum on time $T_{MIN}$. For example, the control circuit 240 may decrease the on time $T_{ON}$ from the minimum on time $T_{MIN}$ to an ultra-low minimum on time $T_{MIN-UL}$ while maintaining the frequency $f_{LOAD}$ constant at the minimum PWM frequency $f_{MIN}$ to control the intensity of the LED light source 102 below the minimum intensity $L_{MIN}$ to an ultra-low minimum intensity $L_{MIN-UL}$. For instance, the control circuit may dim the LED light source to off by pulse width modulating the load current (i.e., the ultra-low minimum intensity may be 0% intensity). In such examples, the minimum PWM frequency may be decreased below 120 Hz. The control circuit 240 may decrease the on time $T_{ON}$ until the hardware limitations of the control circuit 240 prevent the on time $T_{ON}$ from being decreased any further.

The control circuit 240 may be configured to dim the LED light source 102 to off. The control circuit 240 may be configured to control the intensity of the LED light source 102 from the predetermined threshold to off by pulse frequency modulating the load current $I_{LOAD}$. The control circuit 240 may be configured to pulse width modulate the load current $I_{LOAD}$ when the target intensity is below the minimum intensity $L_{MIN}$. As such, the control circuit 240 may be configured to control the intensity of the LED light source 102 from the minimum intensity $L_{MIN}$ to off by pulse width modulating the load current $I_{LOAD}$.

In one or more embodiments, the control circuit 240 may control the intensity of the LED light source 102 by decreasing the magnitude of the DC bus voltage $V_{BUS}$. For example, the control circuit 240 may be configured to control the intensity of the LED light source 102 below the minimum intensity level $L_{MIN}$ by decreasing the magnitude of the DC bus voltage $V_{BUS}$. The control circuit may be configured to maintain a frequency $f_{LOAD}$ of the load current $I_{LOAD}$ constant (e.g., at the minimum PWM frequency $f_{MIN}$), maintain an on time $T_{ON}$ of the load current $I_{LOAD}$ constant (e.g., at the minimum on time $T_{MIN}$ or at the ultra-low minimum on time $T_{MIN-UL}$), and decrease a magnitude of the DC bus voltage $V_{BUS}$ when the target intensity $L_{TRGT}$ is below the minimum intensity $L_{MIN}$. For example, control circuit may control the intensity of the LED light source 102 to off by decreasing the magnitude of the DC bus voltage $V_{BUS}$.

The high-end intensity $L_{HE}$ may be approximately 100%. The low-end intensity $L_{LE}$ may be approximately 1%. The minimum intensity $L_{MIN}$ may be approximately in the range of 0.1-1%. The ultra-low minimum intensity $L_{MIN-UL}$ may be approximately in the range of 0-0.1%. For example, the ultra-low minimum intensity $L_{MIN-UL}$ may be 0% (i.e., off). The maximum on time $T_{MAX}$ may be approximately 1.8 msec. The minimum on time $T_{MIN}$ may be approximately 18 μsec. The ultra-low minimum on time $T_{MIN-UL}$ may be approximately 1 μsec. The normal PWM frequency $f_{NORM}$ may be approximately in the range of 500-550 Hz. The minimum PWM frequency $f_{MIN}$ may be approximately in the range of 120-150 Hz.

Although illustrated in FIGS. 4A-4B and FIGS. 5A-5B as controlling the length of the on time $T_{ON}$ of the load current $I_{LOAD}$ between the high-end intensity $L_{HE}$ and the minimum intensity $L_{MIN}$ and controlling the frequency $f_{LOAD}$ of the load current $I_{LOAD}$ between the minimum intensity $L_{MIN}$ and the ultra-low minimum intensity $L_{MIN-UL}$, the control circuit 240 may be configured to control the intensity of the LED light source 102 by pulse width modulating the load current $I_{LOAD}$ when the target intensity is within a first intensity range and control the intensity of the LED light source 102 by pulse frequency modulating the load current $I_{LOAD}$ when the target intensity is within a second intensity range. The first intensity range may be greater than or less than the second intensity range. Further, the control circuit 240 may be configured to control the intensity of the LED light source 102 by pulse width modulating the load current $I_{LOAD}$ when the target intensity is within a third intensity range. The third intensity range may be below a known operating range of the LED light source 102. As such, the control circuit 240 may control the LED light source 102 by adjusting a first parameter (e.g., on time $T_{ON}$ of the load current $I_{LOAD}$) to a control point that produces a known, reliable response of the LED light source 102 (e.g., the low-end intensity $L_{LE}$), adjusting a second parameter (e.g., the frequency $f_{LOAD}$ of the load current $I_{LOAD}$) to a second control point that may or may not produce a known reliable response of the LED light source 102, and adjusting the first parameter past the second control point, which may produce an unknown and potentially unreliable response of the LED light source 102. However, this may be acceptable because the control circuit 240 may be fading the LED light source 102 to off.

The control circuit 240 may be configured to receive a command and control (e.g., dim) the intensity of the LED light source 102 below the first intensity range and below the second intensity range to off. For example, the load control circuit may be configured to control the intensity of the LED light source 102 below the second intensity range to off by pulse width modulating and/or pulse frequency modulating the load current $I_{LOAD}$. The load control circuit may be configured to control the intensity of the LED light source 102 below the first intensity range and below the second intensity range to off by maintaining the frequency $f_{LOAD}$ of the load current $I_{LOAD}$ constant, maintaining the on time $T_{ON}$ of the load current $I_{LOAD}$ constant, and decreasing the magnitude of the DC bus voltage $V_{BUS}$.

The control circuit 240 may control the length of the on time $T_{ON}$ and/or the frequency $f_{LOAD}$ of the load current $I_{LOAD}$ to adjust the intensity of the LED light source 102 between the minimum intensity $L_{MIN}$ (e.g., 0.1%) and the high-end intensity $L_{HE}$ (e.g., 100%) during, for example, normal operation of the LED driver (i.e., not only when the LED driver is fading the intensity of the LED light source to off).

One or more of the embodiments described herein (e.g., as performed by a load control device) may be used to decrease the intensity of a lighting load and/or increase the intensity of the lighting load. For example, one or more embodiments described herein may be used to adjust the intensity of the lighting load from on to off, off to on, from a higher intensity to a lower intensity, and/or from a lower intensity to a higher intensity. For example, although described as adjusting the intensity of the LED light source 102 from the present intensity $L_{PRES}$ to off (e.g., 0%), the LED driver may adjust (e.g., fade) the intensity of the LED light source 102 from off (e.g., 0%) to a target intensity $L_{TRGT}$ (e.g., an intensity between an ultra-low minimum intensity $L_{MIN-UL}$ and a high-end intensity $L_{HE}$) to over the fade time period $T_{FADE}$ (e.g., in accordance with FIGS. 4A, 4B, 5A, and/or 5B).

Although described with reference to an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. A load control device for controlling an intensity of a lighting load, the load control device comprising:
   a load regulation circuit configured to control a magnitude of a load current conducted through the lighting load, the load regulation circuit including a regulation transistor adapted to be coupled in series with the lighting load; and
   a control circuit operatively coupled to the regulation transistor of the load regulation circuit for adjusting the magnitude of the load current to control the intensity of the lighting load to a target intensity, the control circuit configured to generate a control signal for rendering the regulation transistor conductive and non-conductive;

wherein the control circuit is configured to control the intensity of the lighting load by maintaining a frequency of the control signal constant and adjusting an on time of the control signal when the target intensity is above a predetermined threshold, and adjusting the frequency of the control signal when the target intensity is below the predetermined threshold.

2. The load control device of claim 1, wherein the control circuit is configured to maintain the frequency of the control signal at a normal frequency and adjust the on time of the control signal between a maximum on time and a minimum on time when the target intensity is above the predetermined threshold.

3. The load control device of claim 2, wherein the control circuit is configured to maintain the on time of the control signal at the minimum on time and adjust the frequency of the control signal between the normal frequency and a minimum frequency when the target intensity is below the predetermined threshold.

4. The load control device of claim 3, wherein the control circuit is configured to control the intensity of the lighting load by pulse width modulating the regulation transistor when the target intensity is above the predetermined threshold and control the intensity of the lighting load by pulse frequency modulating the regulation transistor when the target intensity is below the predetermined threshold.

5. The load control device of claim 1, further comprising:
a feedback circuit coupled in series with the regulation transistor for generating a feedback signal having a magnitude representative of an average magnitude of the load current;
wherein the control circuit is configured to adjust the on time of the control signal in response to the feedback signal when the target intensity is above the predetermined threshold.

6. The load control device of claim 5, wherein the feedback circuit comprises a resistor coupled in series with the regulation transistor and a filter circuit for generating a filtered signal from a voltage generated across the feedback resistor.

7. The load control device of claim 6, wherein the filter circuit comprises a two-stage resistor-capacitor filter circuit.

8. The load control device of claim 1, further comprising:
a power converter circuit configured to receive a rectified AC voltage and to generate a DC bus voltage;
wherein the load regulation circuit is configured to receive the DC bus voltage.

9. The load control device of claim 8, wherein the control circuit is configured to maintain the frequency of the control signal constant, maintain the on time of the control signal constant, and decrease a magnitude of the DC bus voltage when the target intensity is below a minimum intensity, wherein the minimum intensity is below the predetermined threshold.

10. The load control device of claim 8, wherein the power converter circuit comprises a flyback converter.

11. The load control device of claim 1, wherein the lighting load comprises a light-emitting diode (LED) light source and the load regulation circuit comprises an LED drive circuit.

12. The load control device of claim 1, wherein the load regulation circuit comprises a buck converter.

13. The load control device of claim 1, wherein the control circuit comprises at least one of a microprocessor, a microcontroller, a programmable logic device, an application specific integrated circuit, and a field-programmable gate array.

14. A load control device for controlling power delivered from an AC power source to a lighting load, the load control device comprising:
a flyback converter configured to receive a rectified AC voltage and to generate a DC bus voltage, the flyback converter configured to provide isolation between the AC power source and the lighting load;
a buck converter configured to receive the DC bus voltage and control a magnitude of a load current conducted through the lighting load, the buck converter including a regulation transistor adapted to be coupled in series with the lighting load; and
a control circuit operatively coupled to the regulation transistor for adjusting the magnitude of the load current to control an intensity of the lighting load to a target intensity, the control circuit configured to generate a control signal for rendering the regulation transistor conductive and non-conductive;
wherein the control circuit is configured to control the intensity of the lighting load by maintaining a frequency of the control signal constant and adjusting an on time of the control signal when the target intensity is above a predetermined threshold, and adjusting the frequency of the control signal when the target intensity is below the predetermined threshold.

15. The load control device of claim 14, wherein the control circuit is configured to maintain the frequency of the control signal at a normal frequency and adjust the on time of the control signal between a maximum on time and a minimum on time when the target intensity is above the predetermined threshold.

16. The load control device of claim 15, wherein the control circuit is configured to maintain the on time of the control signal at the minimum on time and adjust the frequency of the control signal between the normal frequency and a minimum frequency when the target intensity is below the predetermined threshold.

17. The load control device of claim 16, wherein the control circuit is configured to control the intensity of the lighting load by pulse width modulating the regulation transistor when the target intensity is above the predetermined threshold and control the intensity of the lighting load by pulse frequency modulating the regulation transistor when the target intensity is below the predetermined threshold.

18. A method for controlling an intensity of a lighting load, the method comprising:
generating a control signal for rendering a regulation transistor conductive and non-conductive to adjust a magnitude of a load current conducted through the lighting load;
receiving a target intensity for the lighting load;
when the target intensity is above a predetermined threshold, maintaining a frequency of the control signal constant and adjusting an on time of the control signal to control the intensity of the lighting load; and
when the target intensity is below the predetermined threshold, adjusting the frequency of the control signal to control the intensity of the lighting load.

19. The method of claim 18, further comprising:
when the target intensity is above the predetermined threshold, maintaining the frequency of the control signal at a normal frequency and adjusting the on time of the control signal between a maximum on time and a minimum on time; and when the target intensity is below the predetermined threshold, maintaining the on time of the control signal at the minimum on time and adjusting the frequency of the control signal between the normal frequency and a minimum frequency.

20. The method of claim 18, further comprising:

receiving a feedback signal having a magnitude representative of an average magnitude of the load current; and adjusting the on time of the control signal in response to the feedback signal when the target intensity is above the predetermined threshold.

* * * * *